United States Patent [19]

Rigdon et al.

[11] 3,956,389

[45] May 11, 1976

[54] PREPARATION OF SECONDARY ALKYL PRIMARY AMINES FROM CRUDE N-PARAFFIN OXIMES

[75] Inventors: Orville Wayne Rigdon, Groves; Lawrence Frank Kuntschik; Robert Sammie Edwards, both of Nederland, all of Tex.

[73] Assignee: Texaco Inc., New York, N.Y.

[22] Filed: Oct. 23, 1974

[21] Appl. No.: 517,130

Related U.S. Application Data

[63] Continuation-in-part of Ser. No. 430,119, Jan. 2, 1974, abandoned.

[52] U.S. Cl. .................. 260/563 D; 260/583 R
[51] Int. Cl.² .......................................... C07C 85/10
[58] Field of Search .................... 260/583 R, 563 D

[56] References Cited
UNITED STATES PATENTS

| 3,210,421 | 10/1965 | Rainer .................. 260/583 R X |
| 3,256,331 | 6/1966 | Jones et al. ............. 260/583 R X |
| 3,520,933 | 7/1970 | Adam et al. ............. 260/583 R X |
| 3,594,419 | 7/1971 | Rosenthal ................ 260/563 D |
| 3,597,438 | 8/1971 | Broke ..................... 260/583 R X |
| 3,646,148 | 2/1972 | Enders ................... 260/583 R X |
| 3,801,640 | 4/1974 | Knifton ................... 260/563 D |

OTHER PUBLICATIONS

Wagner et al., Synthetic Organic Chemistry, John Wiley & Sons, Inc., N.Y., pp. 654–663 (1953).
House, Modern Synthetic Reactions, W. A. Benjamin, Inc., Philippines, pp. 1 to 8 and 210 to 213 (1972).

*Primary Examiner*—Helen M. S. Sneed
*Attorney, Agent, or Firm*—T. H. Whaley; C. G. Ries; George J. Darsa

[57] ABSTRACT

A process for producing secondary alkyl primary amines having from 10 to 50 or, from about 10 to about 13, or from about 14 to 50 carbon atoms from crude n-paraffin oximes derived by the photonitrosation of $C_{10}$ to $C_{50}$ or $C_{10}$ to $C_{13}$ or $C_{14}$ to $C_{50}$ n-paraffins, said process comprising hydrogenation in a polar solvent in the presence of ammonia and a metal catalyst. The crude n-paraffin oximes are contaminated with ketones and nitroso halides. By the process of this invention, these impurities are likewise converted into the corresponding secondary alkyl primary amines.

27 Claims, No Drawings

PREPARATION OF SECONDARY ALKYL PRIMARY AMINES FROM CRUDE N-PARAFFIN OXIMES

CROSS REFERENCE TO RELATED APPLICATION

This application is a continuation-in-part of our co-pending application Ser. No. 430,119, filed Jan. 2, 1974, now abandoned.

BACKGROUND OF THE INVENTION

This invention relates to a process for producing secondary alkyl primary amines from n-paraffin oximes. More particularly, it relates to a process for preparing secondary alkyl primary amines having from about 10 to 50 or about 10 to about 13 or 14 to 50 carbon atoms from a composition containing principally n-paraffin oximes of about 10 to 50 or 10 to 13 or 14 to 50 carbon atoms which are contaminated with corresponding ketones and nitroso halides.

U.S. Pat. No. 3,578,575 describes a process for producing n-paraffin oximes having from 10 to 13 carbon atoms by photonitrosation of n-paraffins. The product produced by this process can contain up to 95 percent or more of the desired oximes. However, there are present in the product stream by-products comprising principally ketones and gem nitroso halides having from 10 to 13 carbon atoms. Typically, this product stream will contain from about 3 to about 5 wt. percent each of these ketones and nitroso halides. If desired, one can separate the oximes from the ketones and nitroso halides prior to the hydrogenation reaction. However, commercial considerations prompt the development of a process whereby this separation step can be avoided. U.S. Pat. No. 3,775,275 describes the preparation of n-paraffin oximes of 14 to 50 carbons where the process is conducted in the presence of a halogenated organic solvent and where the product is contaminated with ketones.

It is therefore an object of this invention to provide an efficient process for preparing $C_{10}$ to $C_{50}$ or $C_{10}$ to $C_{13}$ or $C_{14}$ to $C_{50}$ secondary alkyl primary amines from corresponding n-paraffin oxime compositions which are contaminated with corresponding ketones and nitroso halides.

It is another object of this invention also to convert the contaminants into secondary alkyl primary amines.

Still another object is to obtain these secondary alkyl primary amines by a process which inhibits the formation of undesirable secondary and tertiary amines.

Other objects and advantages will become apparent from a reading of the detailed description of the invention which appears below.

SUMMARY OF THE INVENTION

This invention contemplates a process for the manufacture of secondary alkyl primary amines having from about 10 to 50 or about 10 to about 13 or about 14 to 50 carbon atoms, the process comprising hydrogenating in a polar solvent and in the presence of ammonia and a supported metal hydrogenation catalyst, a crude composition containing principally n-paraffin oximes having from 10 to 50 or 10 to 13 or 14 to 50 carbon atoms contaminated with corresponding ketones and gem nitroso halides. The oximes and the nitroso halides are hydrogenated to the primary amines. At the same time, the ketones are subjected to reductive amination.

DISCUSSION OF THE PRIOR ART

Hydrogenation of oximes to primary amines and the use of ammonia in connection therewith have long been known. For example, in British Pat. No. 282,083, there is disclosed a method for obtaining low molecular weight primary amines from the corresponding oxime by treatment with hydrogen in the presence of a hydrogenating catalyst and ammonia. The catalyst used is not, however, an activated catalyst.

U.S. Pat. No. 3,483,254 discloses the catalytic hydrogenation of 2-bornane methyl oxime to obtain an acid salt of the corresponding primary amine; the hydrogenation takes place in the presence of ammonia.

Lastly, U.S. Pat. No. 3,346,636 teaches that cyclohexanone may be converted to cyclohexylamine by hydrogenation in the presence of a hydrogenation catalyst and ammonia.

This prior art is not concerned with the preparation of n-paraffin amines and does not recognize the possibility that oximes, nitroso halides and ketones can be simultaneously converted into primary amines through the use of ammonia, a proper solvent and appropriate reaction conditions.

DETAILED DISCUSSION OF THE INVENTION

U.S. Pat. Nos. 3,578,575 and 3,775,275 disclose processes for preparing n-paraffin oximes having from about 10 to 50 or from about 10 to about 13 or 14 to 50 carbon atoms by photonitrosation of corresponding n-paraffins. Individual paraffins or mixtures of paraffins can be converted to the corresponding oxime. These n-paraffins, that is individual n-paraffins or mixtures thereof comprising, for example, $C_{10}$–$C_{13}$ n-paraffins, $C_{14}$–$C_{26}$ n-paraffins or $C_{17}$–$C_{35}$ n-paraffins are obtained from middle distillates by adsorption in molecular sieves or from urea dewaxing or from refined wax. These n-paraffin oximes, which are the starting materials for the process of the instant invention, are obtained from the n-paraffins by a process which comprises (a) photochemically reacting in a light transmittable reaction vessel a n-paraffin of from 10 to 50 carbons or $C_{10}$ to $C_{13}$ or $C_{14}$ to $C_{50}$ n-paraffin with a gaseous nitrosating agent, where said nitrosating agent partial pressure is from about 50 to 700 mm of mercury or at least 125 mm of mercury, and under the influence of light excluding wavelengths below 200 millimicrons, (b) separating the unreacted normal paraffin and the reaction products of (a), and (c) neutralizing the separated reaction products of (b). The nitrosating agent is preferably a nitrosyl halide, particularly nitrosyl chloride. Where $C_{14}$ to $C_{50}$ n-paraffins are to be converted to oximes, the photochemical reaction is conducted in the presence of a halogenated organic solvent.

Further details concerning the preparation of the starting materials for the process of the instant invention may be found in the disclosures of U.S. Pat. Nos. 3,578,575 and 3,775,275 which are incorporated herein by reference.

The oxime products produced by the aforementioned photonitrosation reaction can be obtained in up to 95 percent purity. The remainder of the product stream comprises principally ketones and nitroso halides in amounts of, typically, from about 3 to about 5 percent each. The higher molecular weight oxime products may also contain resinous materials in amounts of about 10 percent. Hydrogenation of this oxime stream by a normal method, e.g., in the presence of a supported hydrogenation catalyst, would cause the oximes to be converted into the desired secondary alkyl primary amines. However, the ketone and nitroso halide by-products would be converted into undesirable products. Although it is possible to remove the ketones and nitroso halide by methods well known in the art, thus leaving a substantially pure oxime product stream, this removal process is economically undesirable.

It has now been discovered that the crude oxime stream can be hydrogenated in a polar solvent, in the presence of ammonia and a supported hydrogenation catalyst, to yield secondary alkyl primary amines. The reactions which take place result in the conversion of the oximes, the ketones and the nitroso halide to the corresponding secondary alkyl primary amines. These reactions are as follows:

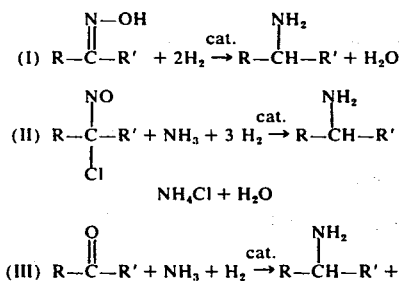

In these equations, the group R—C—R' represents a carbon chain of from 10 to 50 or from 10 to about 13 or 14 to 50 carbon atoms.

Thus, as indicated in the foregoing reaction schemes, the use of ammonia permits the conversion of the nitroso halide and ketone impurities to amines. The presence of ammonia also has the effect of inhibiting side reactions of the types

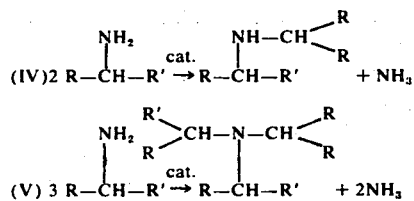

which produce undesirable secondary and tertiary amines.

The hydrogenation catalysts usable in the process of the instant invention are the usual supported metal hydrogenation catalysts. The metals may be, for example, platinum rhodium, nickel or cobalt, preferably nickel or cobalt, and more preferably, nickel. The catalyst support may be, for example, alumina, silica alumina, carbon or kieselguhr, preferably alumina or silica alumina.

Critical for the process of this invention is the use of a polar solvent capable of absorbing sufficient ammonia, while at the same time being non-reactive with ammonia. The polar solvent should be one capable of at least partially solubilizing the oxime. Any solvent or mixture of polar solvents meeting these criteria will suffice. We prefer to employ as the polar solvent members of the group consisting of alcohols, ethers, and mixture thereof. Exemplary of such solvents are the $C_1$ to $C_6$ alkanols, in particular methanol and ethanol. Other polar solvents include $C_3$ to $C_8$ acyclic and cyclic ethers such as methylethylether, diethylether, isopropylether, ethylene glycol diethylether, diethylene glycol diethylether, propylene glycol diethylether, dipropylene glycol diethylether, tetrahydrofuran, 1,4-dioxane and tetrahydropyran, diethylene glycol monoethylether, ethylene glycol monoethylether, propylene glycol monoethylether, and dipropylene glycol monoethylether. Mixtures of polar solvents can also be employed such as mixtures of alcohols and ethers. Mixtures of polar solvents are preferred when $C_{14}$ to $C_{50}$ oximes and ketones are to be converted to the corresponding amines and we particularly prefer mixtures of alcohols and ethers such as methanol and tetrahydrofuran. The mixtures of polar solvents are not only capable of absorbing sufficient ammonia but additionally aid in solubilizing the higher molecular weight oximes of 14 to 50 carbons in the reaction.

Ammonia should be employed in an amount sufficient for reactions (II) and (III) and to provide a reasonable excess. Generally, it is recommended that ammonia be used in an amount of about from 2 to about 5 times that required by the stoichiometry of reactions (II) amd (III). Usually we employ from 50 to 500 moles of ammonia per mole of nitroso halide and ketone, preferably 100 to 300 moles of ammonia per mole of nitroso halide and ketone as these amounts are sufficient for reactions (II) and (III), and further inhibit reactions (IV) and (V).

The reactions may be run over a wide range of temperatures between about 40° and about 400°F. Preferably, reaction temperatures are from about 75° to about 212°F., more preferably from about 150° to about 212°F.

Reaction pressure may range from atmospheric pressure up to about 2,000 p.s.i.g., preferably from about 50 to about 600 p.s.i.g., more preferably from about 400 to about 600 p.s.i.g.

The invention will be better understood by reference to the following examples, which are included here for illustrative purposes only and are not to be construed as limitations.

EXAMPLES

EXAMPLE 1

Activation Supported Support Nickel and Cobalt Catalysts

The desired batch of catalyst, usually 200 to 500 grams, was charged to a 2 liter AMINCO Rocker Bomb which was sealed and pressurized four times with 100–200 p.s.i.g. of nitrogen to purge the air. This purging procedure was repeated using hydrogen, following which the bomb was pressurized to 500 p.s.i.g. with hydrogen and allowed to stand while being heated to the desired activation temperature. When the activation temperature was attained, the bomb was vented each half hour during the first four hour interval to remove water vapor formed as a result of the activation reaction. During the venting procedure, the pressure was allowed to drop to 300 p.s.i.g. and the bomb was then pressurized to 500–1000 p.s.i.g. using hydrogen. After the initial four hours, venting was carried out once each hour until water vapor no longer appeared in the vent gas. The bomb and its contents were than allowed to cool to ambient temperature, followed by venting to atmospheric pressure. After purging the bomb with a nitrogen stream, the contents were transferred to a sealed can under a nitrogen blanket. The can and contents were stored under said nitrogen blanket until needed for use.

methanol. The combined initial centrifugate and the catalyst wash centrifugate was stripped on a rotary

TABLE I

| Catalyst | Description | Activation Temp. °F. | H₂ Pressure psig | Time Required for Activation-hrs. |
|---|---|---|---|---|
| Ni 1404T Harshaw | Tableted 72% Ni (45% reduced Ni) on Silica Alumina. (3/16") | 600 | 500 | 4 |
| Ni 3210T Harshaw | Tableted 35% Ni on calcium aluminate. Crush strength ca. 30 lbs. (3/16") | 695–700 | 700 | 20 |
| Ni 0116T Harshaw | Tableted Ca. 60% Ni on Kieselguhr. Crush strength 25–35 lbs. (3/16") | 660–700 | 700 | 4 |
| Aero 205 Extrudate American Cyanamid | 53% NiO on 3/16" Silica Pellets. | 650–660 | 700–1000 | 72 |
| G-52 Girdler | Tableted 35% Ni on alumina (3/16") crush strength ca. 30 lbs. | 700 | 700 | 4 |
| Co 0101T Harshaw | Tableted 38% CoO on Kieselguhr. (3/16") | 650–700 | 700–800 | 5 |
| T-302 Girdler | Tableted 10–12% Co (as oxide) on gamma alumina (1/8") | 690–750 | 680–740 | 10* |

*No $H_2O$ given off at <690°F.

EXAMPLE 2

Hydrogenation Reaction Procedure

The desired amount of catalyst, oxime feedstock and ammonia saturated methanol was charged to a Parr Rocker Bomb glass liner and the free volume was recorded. The liner containing the charge was placed in the bomb and the bomb was purged three times with nitrogen to remove air. The system was pressured to 600 p.s.i.g of hydrogen and heated to the desired temperature at which time the pressure was recorded. The pressure was recorded at 30 minute intervals throughout the run and the hydrogen used and the rate of hydrogenation were calculated based on the pressure change. Upon completion of the hydrogenation as indicated by no additional pressure drop, the system was cooled and depressurized. The reaction mixture was centrifuged and the catalyst was washed with fresh methanol. The combined initial centrifugate and the catalyst wash centrifugate was stripped on a rotary evaporator at 120° to 130°F. to remove methanol, water and unused ammonia. The catalyst was dried over nitrogen and stored in a nitrogen atmosphere. The crude amine was then analyzed by infrared and VPC.

EXAMPLE 3

The fact that an ammonia activated nickel catalyst enhances the oxime hydrogenation rate (particularly at lower temperatures) and selectively to secondary alkyl primary amines is shown in the following Table II.

TABLE II

| Run No. | AMMONIA EFFECT ON OXIME HYDROGENATION | | | | | |
|---|---|---|---|---|---|---|
| | 1[b] | 2[b] | 3[c] | 4[c] | 5[c] | 6[c] |
| Temperature, °F. ± 2° | 75 | 75 | 75 | 212 | 75 | 212 |
| Pressure, p.s.i.g. | 30 | 30 | 500 | 500 | 500 | 500 |
| Catalyst | Ni 0104P[d] | Ni 0104P[d] | Ni 0104[d] | Ni 0104[d] | Ni 0104[d] | Ni 0104[d] |
| wt., g. | 16.0 | 16.0 | 16.0 | 16.0 | 16.0 | 16.0 |
| Oximes, wt., g. | 20.0 | 20.0 | 19.4 | 19.4 | 19.4 | 19.4 |
| Solvent | $CH_3OH$ | $CH_3OH/NH_3$[e] | $CH_3OH$ | $CH_3OH$ | $CH_3OH/NH_3$[e] | $CH_3OH/NH_3$[e] |
| vol., ml. | 200 | 200 | 200 | 200 | 200 | 200 |
| Rate $H_2$ Uptake[a] mol. $H_2$/min. (× 10⁴) | 0.81 | 4.40 | Nil | 5.45 | 3.21 | 3.1 |
| Product Analysis Infrared | 20% Ketone No Amine | 90+% Amine | Oxime | Amines | Amines | Amines |
| VPC, wt.% | | | | | | |
| $C_{10}$–$C_{13}$ Amines | — | — | — | 83.9 | 91.6 | 88.1 |
| Heavier than $C_{14}$ Amines | — | — | — | 7.4 | 1.7 | 5.3 |
| Hydrocarbon | — | — | — | 8.7 | 6.7 | 6.6 |

[a] Average rate to terminaton of H uptake.
[b] Runs conducted in Parr Series 3910 Hydrogenation Apparatus - Shaker Type.
[c] Runs conducted in Parr Series 4000 Rocker Bomb.
[d] Harshaw Ni 0104 catalyst contains ~60% nickel or kieselguhr.
[e] Ammonia saturated methanol containing 16.5% $NH_3$.

It should also be noted, from the above Table, that the decrease in "heavier than $C_{14}$ amines" resulting from use of ammonia indicates that the formation of secondary and tertiary amines is greatly reduced.

EXAMPLE 4

Using a Parr Rocker Bomb (Series 4000), with Harshaw Ni 0104T catalyst (40 grams) and an oxime charge of 46.5 grams, the effect of ammonia and/or methanol on the reduction of oximes was evaluated. Reaction temperature was 150°F. and the pressure was 400–600 p.s.i.g. The results are shown in Table III.

TABLE III

METHANOL-$NH_3$ CHARGE EVALUATION

| Run No. | Wt. $CH_3OH$—$NH_3$, g. | Wt. $NH_3$, g.* | Oxime/$CH_3OH$—$NH_3$ (Wt.) | Wt.% $C_{10}$–$C_{13}$ Amines (In Crude Product) |
|---|---|---|---|---|
| 1 | 96.0 | 15.84 | 0.484 | 92.4 |
| 2 | 48.0 | 7.92 | 0.968 | 88.3 |
| 3 | 24.0 | 3.96 | 1.936 | 78.6 |

*Calculated assuming $NH_3$ saturated methanol contains 16.5% $NH_3$.

An oxime to $CH_3OH$—$NH_3$ weight ratio of 0.484 gives excellent selectivity to secondary alkyl primary amines; however, an increase in this ratio to 1.936 reduces the selectivity substantially. Although the amount of ammonia theoretically required to reductively aminate the ketones present in the 46.5 gram oxime charge is only 0.2 gram, the data indicates that excess ammonia is required for good results.

EXAMPLE 5

To demonstrate that a polar solvent is required in the practice of this invention, various runs were made using methanol, cyclohexane and mixtures of the two. The reactions took place in a Parr Rocker Bomb (Series 2000), with an oxime charge of 46.5 grams (0.25 mole). The reaction temperature was 150°F., and pressure of 400 to 600 p.s.i.g. were used.

Cyclohexane alone as a solvent did not promote oxime hydrogenation. The data for methanol used alone and in combination with cyclohexane are shown in the following Table IV.

solvent, it is saturated with ammonia prior to charging (containing 16.5 weight percent ammonia at ambient temperature). The bomb is pressured to 600 p.s.i.g. with hydrogen and heated to 150°F. and the hydrogen pressure is maintained at 400–600 p.s.i.g. for six hours. At the end of the run, the system is cooled, depressurized, the reaction mixture centrifuged and the catalyst washed free of solvent. The combined centrifugate is stripped on a rotary evaporator at 120° –130°F. to remove solvent, water and unreacted ammonia.

TABLE V

HYDROGENATION OF $C_{14}$ AND HIGHER OXIMES

| Run No. | 1 | 2 | 3 | 4 | 5 |
|---|---|---|---|---|---|
| Charge, wt. gm. | | | | | |
| Catalyst | 40.0 | 40.0 | 40.0 | 40.0 | 40.0 |
| Crude Oxime | 46.5 | 46.5 | 46.5 | 46.5 | 46.5 |
| Cyclohexane | 96.0 | — | 96.0 | — | — |
| Methanol | — | 96.0 | 96.0 | 96.0 | — |
| Tetrahydrofuran | — | — | — | 96.0 | 96.0 |
| $NH_3$ | 15.8 | 15.8 | 15.8 | 15.8 | 15.8 |
| Product, wt.% | | | | | |
| n-Paraffins | 2.30 | 2.40 | 2.25 | 2.35 | 2.30 |
| Oximes | 83.07 | 62.30 | 22.10 | 0.73 | 23.25 |
| Amines | 0.00 | 18.30 | 64.10 | 85.60 | 63.05 |
| Ketones | 3.41 | 5.60 | 0.20 | 0.00 | 0.15 |
| Resinous Materials | 11.22 | 11.40 | 11.35 | 11.32 | 11.25 |

TABLE IV

SOLVENT EFFECT ON HYDROGENATION

| Run No. | Solvent, Wt.% | | Catalyst (Wt., g.) | Hydrogen Uptake* (Moles) | Wt.% $C_{10}$–$C_{13}$ Amine (In Crude Product) |
|---|---|---|---|---|---|
| 1 | Methanol ($NH_3$) | | Ni 0104T (40.0) | 0.55 | 92.4 |
| 2 | Methanol ($NH_3$) Cyclohexane | - 50% - 50% | Ni 0104T (40.0) | 0.478 | 78.5 |
| 3 | Methanol ($NH_3$) | | Ni 1404T (40.0) | 0.549 | 94.5 |
| 4 | Methanol ($NH_3$) Cyclohexane | - 50% - 50% | Ni 1404T (40.0) | 0.455 | 68.1 |
| 5 | Methanol ($NH_3$) Cyclohexane | - 33 ⅓% - 67 ⅔% | Ni 1404T (40.0) | 0.446 | 53.3 |
| 6 | Methanol ($NH_3$) Cyclohexane | - 25% - 75% | Ni 1404T (40.0) | 0.436 | 46.6 |
| 7 | Methanol ($NH_3$) | | G-49B | 0.494 | 87.1 |
| 8 | Methanol ($NH_3$) Cyclohexane | - 50% - 50% | G-49B | 0.439 | 60.9 |

*Theoretical Hydrogen required = 0.5 mole.

The foregoing data indicate clearly that the use of a polar solvent, namely methanol, gives results which are considerably better than the use of methanol in combination with cyclohexane, a non-polar solvent.

EXAMPLE 6

A crude $C_{14}$–$C_{26}$ oxime mixture is obtained by photonitrosation of a $C_{14}$–$C_{26}$ paraffin wax and has a composition expressed in weight percent as follows: 85.42 oximes, 2.36 ketones, 2.17 paraffins and 10.05 resinous material. The oxime mixture is used as the charge stock in the hydrogenations tabulated in Table V. The desired amount of catalyst, oximes and solvent are charged to a Parr Rocker Bomb (Series 4000) with Harshaw Ni 0104T catalyst (40 grams) and an oxime charge of 46.5 grams. When methanol is used as a A comparison of Runs 1 and 2 reveals that cyclohexane-ammonia is not a suitable system for hydrogenating $C_{14}$–$C_{26}$ oximes whereas methanol and ammonia do facilitate hydrogenation. The highest conversion of oximes to amines is in Run 4 where a mixture of methanol and tetrahydrofuran is used as the solvent system and where the solubility of the oxime is complete and where the conversion of oximes and ketones to amines is complete. The use of tetrahydrofuran alone in Run 5 shows it to be capable of absorbing sufficient ammonia and solubilizing the oximes. The use of a combination of a polar/non-polar solvent system (methanol/cyclohexane) in Run 3 was not as effective as a combination of polar solvents in Run 4.

What is claimed is:

1. A process for the manufacture of a secondary alkyl primary amine having from 10 to about 50 carbon atoms which comprises hydrogenating in a polar solvent and in the presence of ammonia and a supported metal hydrogenation catalyst, where said metal is platinum, rhodium, nickel or cobalt, a composition consisting essentially of an n-paraffin oxime having from 10 to about 50 carbon atoms contaminated with corresponding ketone and gem nitroso halide.

2. A process according to claim 1 wherein said amine and said oxime have from about 10 to about 13 carbon atoms.

3. A process according to claim 1 wherein said amine and said oxime have from about 14 to 50 carbon atoms.

4. A process according to claim 1 wherein said oxime is a mixture of $C_{10}$ to $C_{13}$ oximes.

5. A process according to claim 1 wherein said oxime is a mixture of $C_{14}$ to $C_{26}$ oximes.

6. A process according to claim 1 wherein said oxime is a mixture of $C_{17}$ to $C_{35}$ oximes.

7. A process according to claim 1 wherein said ammonia is present in substantial excess of the amount required to aminate the ketones present in the starting composition.

8. A process according to claim 7 wherein said solvent is saturated with ammonia.

9. A process according to claim 1 wherein said solvent is a $C_1$ to $C_6$ alkanol.

10. A process according to claim 9 wherein said solvent is methanol.

11. A process according to claim 9 wherein said solvent is ethanol.

12. A process according to claim 1 wherein said solvent is a $C_3$ to $C_8$ ether.

13. A process according to claim 12 wherein said solvent is tetrahydrofuran.

14. A process according to claim 12 wherein said solvent is 1,4-dioxane.

15. A process according to claim 12 wherein said solvent is diethylene glycol monoethylether.

16. A process according to claim 12 wherein said solvent is ethylene glycol monoethylether.

17. A process according to claim 1 wherein said solvent is a mixture of an alcohol and an ether.

18. A process according to claim 1 wherein said solvent is a mixture of methanol and tetrahydrofuran.

19. A process according to claim 1 wherein said catalyst is supported on alumina, silica alumina, carbon or kieselguhr.

20. A process according to claim 19 wherein said catalyst is nickel or cobalt.

21. A process according to claim 20 wherein said catalyst is nickel supported on alumina or silica alumina.

22. A process according to claim 1 wherein hydrogenation is undertaken at a temperature of between about 40° and about 400°F.

23. A process according to claim 22 wherein said temperature is between 75° and 212°F.

24. A process according to claim 23 wherein said temperature is between 150° and 212°F.

25. A process according to claim 1 wherein hydrogenation is undertaken at pressure ranges of from atmospheric pressure up to about 2000 p.s.i.g.

26. A process according to claim 25 wherein said pressure ranges from 50 to 600 p.s.i.g.

27. A process according to claim 26 wherein said pressure ranges from 400 to 600 p.s.i.g.

* * * * *